United States Patent [19]

Murphy et al.

[11] 4,454,253

[45] Jun. 12, 1984

[54] POLYURETHANE FOAM GAME BALL, COMPOSITION AND PROCESS

[75] Inventors: John R. Murphy, Wayne; John S. Babiec, Jr., Berwyn; Joseph A. Meyers, Newtown Square, all of Pa.

[73] Assignee: Atlantic Richfield Co., Los Angeles, Calif.

[21] Appl. No.: 533,711

[22] Filed: Sep. 19, 1983

[51] Int. Cl.$^3$ .................. C08G 18/14; C08G 18/77; C08G 18/62; C08G 18/24

[52] U.S. Cl. .................. 521/112; 264/46.9; 521/126; 521/129; 521/162; 521/170; 521/904; 273/58 J

[58] Field of Search ............... 521/904, 170, 112, 126, 521/129, 162; 264/41, 46.9, DIG. 77

[56] References Cited

U.S. PATENT DOCUMENTS

| | | | |
|---|---|---|---|
| 2,861,981 | 11/1958 | Frank et al. | 528/83 |
| 3,069,170 | 12/1962 | Dillon | 264/53 |
| 3,098,658 | 7/1963 | Murphy | 528/76 |
| 3,637,558 | 1/1972 | Verdol et al. | 524/705 |
| 3,714,110 | 1/1973 | Verdol et al. | 524/848 |
| 3,974,238 | 8/1976 | Schweiker et al. | 525/288 |
| 3,976,295 | 8/1976 | Heald | 264/45.5 |
| 4,149,720 | 4/1979 | Heald | 273/60 R |
| 4,256,304 | 3/1981 | Smith et al. | 273/60 B |

OTHER PUBLICATIONS

Sinclair Petrochemicals, Inc. Product Data Bulletin 505, Jun. 1967, "Poly-BD", 43 pp. +i–iv.

*Primary Examiner*—H. S. Cockeram
*Attorney, Agent, or Firm*—C. R. Reap; D. M. Kozak; J. C. Martin, Jr.

[57] ABSTRACT

An improved game ball is manufactured from a polyurethane foam prepared from a hydroxyl-containing diene polymer, a catalyst system comprised of a tin compound and a tertiary amine and a surfactant system comprised of a non-hydrolyzable silicone-polyether copolymer and a polydialkylsiloxane.

10 Claims, No Drawings

POLYURETHANE FOAM GAME BALL, COMPOSITION AND PROCESS

BACKGROUND OF THE INVENTION

This invention relates to polyurethane foams and more particularly to polyurethane foam compositions having densities and rebound properties such that they are particularly useful for use in manufacturing game balls.

Game balls, such as baseballs and softballs, have been traditionally manufactured by winding several layers of wool and cotton yarn around a cork and rubber center to provide a ball having a desired density and rebound. As can be appreciated, considerable labor is required in the manufacture of such balls. Furthermore, the rising cost of wool, cotton, and synthetic yarns over the last several years, has made it desirable to find suitable less expensive substitutes. Consequently, considerable effort has been expended to find substitute materials and manufacturing techniques which will facilitate the production of less expensive balls having superior rebound properties without reducing the quality of the finished ball.

PRIOR ART

U.S. Pat. Nos. 3,976,295 and 4,149,720, issued to Heald, disclose the manufacture of baseballs and softballs having a polyurethane foam core and a leather outside covering. U.S. Pat. No. 3,069,170, issued to Dillon, Jr., describes the manufacture of a practice ball having a core prepared from a polyolefin foam. U.S. Pat. No. 4,256,304, issued to Smith et al, discloses the manufacture of a polyurethane foam baseball suitable for use in pitching machines. U.S. Pat. No. 3,098,658 discloses golf balls having polyurethane cores. Sinclair Petrochemicals, Inc. Product Data Bulletin No. 505, published in June 1967, describes the preparation of urethane foams from hydroxyl-terminated butadiene resins (pages 16, 17). U.S. Pat. No. 3,637,558, issued to Verdol et al, discloses elastomeric compositions prepared from asphalt and partially uncured urethanes of hydroxyl-terminated diene polymers. U.S. Pat. No. 3,714,110, issued to Verdol et al, discloses oil extended polyurethanes prepared from hydroxyl-terminated diene polymers.

Although the concept of using polyurethane foams in the manufacture of game balls has been disclosed in the prior art, the polyurethane foams generally available prior to the present invention have low rebound properties. For example, Heald discloses the manufacture of a baseball with a polyurethane foam core having a rebound of 33 percent and Smith et al disclose the manufacture of a polyurethane foam practice baseball having a rebound of 32 percent. It would be desirable to have the capability of manufacturing game balls having all of the desirable properties of conventional game balls but having enhanced rebound properties.

In the present invention, polyurethane foams having excellent rebound properties and which are particularly suitable for use in the manufacture of playing balls are described. Accordingly, it is an object of the invention to present improved polyurethane foam compositions. It is another object of the invention to present polyurethane foam compositions having superior rebound properties. It is another object of the invention to present polyurethane foam compositions which are particularly adaptable for use in the manufacture of game balls. It is another object of the invention to present inexpensive game balls which have excellent rebound properties. These and other objects of the invention are supported in the following description and examples.

SUMMARY OF INVENTION

In accordance with the teachings of the invention game balls having rebound properties and densities which make them particularly suitable for use in sports are manufactured from specific formulations comprising hydroxyl-terminated liquid diene polymers, polyisocyanates, a tin catalyst, a tertiary amine catalyst, a first surfactant to control the cell size of the polyurethane foam being produced and a second surfactant to control final product density.

DETAILED DESCRIPTION OF INVENTION

The hydroxyl-containing liquid diene polymer may be of any normally liquid diene homopolymer or diene-vinyl monomer copolymer. Dienes which are employed to make the hydroxylated diene polymers are unsubstituted, 2-substituted or 2,3-disubstituted 1,3-dienes of up to about 12 carbon atoms. The diene preferably has up to about 6 carbon atoms and the substituents in the 2- and/or 3-position may be hydrogen, alkyl, generally lower alkyl, e.g., of 1 to 4 carbon atoms, aryl (substituted or unsubstituted), halogen, nitro, nitrile, etc. Typical dienes which may be employed are 1,3-butadiene; isoprene, chloroprene; 2-cyano-1,3-butadiene; 2,3-dimethyl-1,3-butadiene; etc. The choice of diene will usually depend upon the properties desired in the finished product.

The hydroxyl-containing liquid diene polymer often has a number average molecular weight of up to about 25,000 but is usually in the range of about 500 to 5,000 as determined by cryoscopic, ebullioscopic, osmotic or chromatographic methods.

The polyhydroxyl diene polymers preferred for use in the preparation of the polymers of the invention have an average of at least 1.8 predominantly primary, allylic, terminal hydroxyl groups per polymer molecule. The diene polymer generally has about 1.8 to 3, and preferably 2.1 to 2.8 hydroxyl groups per molecule. Particularly suitable hydroxyl-terminated diene polymers are those having primary hydroxyl groups in terminal allylic positions on the main, generally longest, hydrocarbon chain of the molecule. By "allylic" configuration is meant the alpha-allylic grouping of allylic alcohol, that is, terminal hydroxyls of the intermediate diene polymer attached to a carbon adjacent to a double bond carbon. By terminal hydroxyl is meant that the hydroxyl is attached to a terminal carbon atom, that is, one of the carbon atoms at the end of the polymer chain.

The number and location of the hydroxyl groups and the molecular weight of the hydroxylated diene polymer are, for the most part, a function of polymerization temperature and the type of addition polymerization system employed in forming the polymer.

The hydroxyl-terminated diene homopolymers and copolymers useful in this invention may be prepared by any of the well known procedures, and their method of preparation forms no part of this invention. Suitable diene polymers may be obtained using hydrogen peroxide as the catalyst for polymerization. The free-radical addition polymerization usually takes place at a temperature of about 100° to 200° C.

The preparation of typical hydroxylated diene polymers and copolymers is described in detail in U.S. Pat. Nos. 3,427,366, 3,673,168 and 3,674,743, the disclosures of which are incorporated herein by reference.

The organic polyisocyanates which are reacted with the liquid hydroxyl-containing diene polymer may be any of the polyisocyanates conventionally used to prepare polyurethanes. Polyisocyanates used to prepare polyurethanes include saturated and unsaturated aliphatic and cycloaliphatic compounds, aromatic compounds, aliphatic-substituted aromatic compounds, and aryl-substituted aliphatic compounds, etc. The polyisocyanates used in the invention generally have a functionality of at least 2 and generally of about 2 to 6 isocyanate groups per molecule. It is preferred to use polyisocyanates, which have about 2 to 2.7 functional groups per molecule. Aromatic polyisocyanates are preferred over aliphatic isocyanates as they are considerably less toxic and, therefore, present fewer handling problems and, furthermore, they are generally more reactive than the aliphatic isocyanates. The polyisocyanates used in the invention may contain substituents provided they do not interfere with the desired reaction between the polyisocyanate and the polyol.

Included among the aliphatic isocyanates usable in the invention are alkylene polyisocyanates such as 1,3-diisocyanatopropane; 1,4-diisocyanatobutane; 1,6 diisocyantohexane; 1,3,5-triisocyantopentane; 1,4-cyclohexane diisocyanate; 1,4-cyclohexylene diisocyanate. Examples of aromatic isocyanates are 2,4-tolylene diisocyanate; 2,6-tolylene diisocyanate; mixtures of 2,4- and 2,6-tolylene diisocyanate; p-phenylene diisocyanate; polymethylene polyphenylene diisocyanate; 2,4'-diphenyl methane diisocyanate; 4,4'-diphenyl methane diisocyanate; dimethyl diphenyl methane diisocyanate; bibenzyl diisocyanate; bitolyl diisocyanate; 2,4,6-tolylene triisocyanate; 1,5-naphthalene diisocyanate; 4-chloro-1,3-phenylene diisocyanate; etc. In the case of aromatic isocyanates, the isocyanate groups may be attached to the same or different rings.

It is often desirable to modify the physical properties of the final product by incorporating one or more other polyols and/or other active hydrogen-containing compounds into the reaction mixture. Preferred active hydrogen-containing compounds include aliphatic and aromatic polyols and polyamines and polymers, such as polyester polyols or polyamines, polyether polyols or polyamines and polylactones and similar compounds having two or more OH, NH, or NH$_2$ groups or mixtures of these per molecule and having 2 to about 1,000 carbon atoms with hydroxyl numbers ranging from 12 to 1,100 or more. Mixtures of two or more of these compounds can also be employed. In preparing high molecular weight products it is preferable that the reactive hydrogen content of the polyol or polyamine be in the range of about 2 to 3 groups per molecule. When more highly cross-linked polymeric products are to be prepared, the functionality of these compounds may be somewhat higher than 2 and generally up to about 6 or more groups per molecule. It is preferred that the concentration of materials having functionality greater than 6 be kept low to prevent premature setting of the polyurethane composition.

The lower molecular weight aliphatic and aromatic polyols, polyamines and mercaptans which may optionally be used in the invention include diols, triols, tetrols, etc., for example, ethylene glycol; diethylene glycol; propylene glycol; 1,3 butylene glycol; 1,6 hexanediol; 2 ethyl-1,3-hexanediol; triethylene glycol; 1,4-butanediol; amylene glycol; 2 methyl-2,4-pentanediol; 1,7 heptanediol; glycerine; neopentyl glycol; trimethylol propane; pentaerythritol; cyclohexanediol; sorbitol; mannitol; xylitol; 1,2,5,6 tetrahydroxyhexane; 1,4-dihydroxybenzene, phenyldiisopropylamine, etc., and the corresponding amine-containing and sulfur-containing compounds such as 3,3-dichlorobenzidene; 4,4'-methylene bis(2-chloroaniline); N,N'-bis(1,4-dimethylpentyl)-paraphenylenediamine; ethylene diamine; etc.

Higher molecular weight polyhydroxyl-, polyamine-, and polymercaptan-containing compounds useful for modifying the properties of the final product include, for instance, polymers such as polyhydroxyl polyalkylene ethers, polyhydroxyl polyesters, and hydroxyl group-containing, perferably hydroxyl-group terminated, polymers and the corresponding amine-containing and mercaptan-containing polymers, The polyhydroxyl or polyamine polyalkylene ethers may have a molecular weight greater than about 350 and a hydroxyl number of from about 10 to 600 and may be derived, for example, by the polymerization of alkylene oxides, such as ethylene oxide, propylene oxide, butylene oxide, and the like.

The hydroxyl-, amine-, and mercaptan-containing polyesters may be obtained by the reaction of aliphatic or aromatic dicarboxylic acids with aliphatic or aromatic polyhydric alcohols, polyamines or polymercaptans in the manner well known to the art in proportions that result in esters, amides or thioesters having at least two reactive hydroxy, amino or mercaptan groups. Any polyols, polyamines or polymercaptans may be used to form the esters, amides and thioesters and illustrative of such alcohols, amines and mercaptans are those listed above. Included within the suitable esters, aminoesters, and hydroxyl-containing thioesters are the mono and diglycerides of castor oil, tall oil, soya oil, linseed oil, etc., and the corresponding amine and thio esters.

The preferred optional reactive hydrogen additives are the low molecular weight diols, diamines and mercaptans because they have the ability to impart stiffness to the product.

The above optional polyols, polyamines and polymercaptans may be added in amounts up to about 50 percent and preferably up to about 20 percent, based on the total weight of reactive hydrogen-containing components in the reaction mixture.

In order to prepare a polyurethane foam it is necessary to incorporate a blowing agent into the formulation. When water is employed to produce a blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, vinylidene chloride, dichlorofluoromethane, dichloromethane, trichloromethane, dichlorofluoroethane, hexafluorocyclobutane, and octafluorocyclobutane, may be used as blowing agents.

The catalyst system used in the invention is designed to balance the urethane polymerization reaction and the blowing reaction. This result is obtained by the use of a combination of tin compounds and tertiary amines. The tin catalysts useable in the invention are any of the tin compounds conventionally used to catalyze urethane reactions. The preferred tin compounds include stannic dialkyl diesters having 1 to about 20 or more and preferably 1 to about 6 carbon atoms in each alkyl group and 2 to about 16 total carbon atoms in each ester group. Other preferred tin catalysts are stannous diesters having 2 to about 20 or more and preferably about 6 to 12 carbon atoms in each ester group. The alkyl groups and ester groups in any given catalyst may be identical or different. Examples of suitable stannic dialkyl diesters include dibutyltin dilaurate, dipropyltin dioctoate, tetrabutyltin, dibutyltin diacetate, dibutyltin-di-2-ethylhexoate, etc. Examples of suitable stannous diesters include stannous octoate, stannous oleate and stannous laurate. The most preferred tin catalysts are the dialkyltin diesters, particularly dibutylin dilaurate.

The tertiary amine component of the catalyst systems includes any of the tertiary amine compounds normally used for the manufacture of polyurethane foams including triethylamine; triethylenediamine; N-methylmorpholine; N-ethylmorpholine; diethylethanolamine; 1-methyl-4-dimethylaminoethylpiperazine; 3-methoxy-N-dimethylpropylamine; 2,2'-oxy-bis(N,N-dimethylethylamine); etc. Preferred tertiary amines include 2,2'-oxy-bis(N,N-dimethylethylamine).

In general, the tin catalysts are used to control the polymerization reaction, and the amine catalysts to control the gas reaction, although both catalysts affect both reactions to a certain extent. The relative amounts of the tin and tertiary amine components of the catalyst system are such that the desired degree of polymerization and foam generation are achieved. This result is accomplished by using ratios in the range of about 90 to 10 parts by weight of the tin component and correspondingly about 10 to 90 parts of the tertiary amine component and usually about 75 to 25 parts of the tin component and correspondingly about 25 to 75 parts of the tertiary amine component, per 100 parts by weight of total catalyst.

An important feature of the invention is that the structure of the finished product is controlled by the use of a unique system of surface active agents (surfactants). The surfactant system is comprised of a first component which is a non-hydrolyzable silicone-polyether copolymer having an average molecular weight of about 1000 to 5000 and preferably about 2000 to 4000 and a second component which is a polydialkylsiloxane or mixture of polydialkylsiloxanes. The non-hydrolyzable silicone-polyether copolymers are commonly used to control cell size and structure of polyurethane foams. The second component is generally used in polyurethane manufacture as an antifoam ingredient for the total supression of foam formation in the production of elastomers. In the present invention the above-described properties of the first and second surfactant components are utilized to simultaneously control the cell size and structure and regulate the product density by the control of foam generation.

The non-hydrolyzable silicone-polyether surfactants are compolymers prepared from di-lower alkyl siloxanes and polyalkylene glycols containing allylic unsaturation. Typically, the dialkyl siloxanes have molecular weights in the range of about 500 to 1500 and usually in the range of 200 to 1200. The allylic polyalkylene glycols generally have molecular weights in the range of about 300 to 800 and usually in the range of about 400 to 500. A typical product useful as the first surfactant component is obtained by the reaction of dimethyl siloxane and allylic alcohol initiated polyethylene glycol.

The second surfactant component, the silicone antifoam component is a polydialkylsiloxane or mixture of polydialkylsiloxanes having an average molecular weight in the range of about 250 to 5000 and preferably 500 to 3500. Preferred polydialkylsiloxanes are those having 1 to 4 carbon atoms in each alkyl group. The most preferred polydialkylsiloxane is polydimethylsiloxane.

The relative concentrations of the first and second surfactants are generally in the range of about 10 to 50 parts of non-hydrolyzable silicone-polyether surfactant and 90 to 50 parts of silicone antifoam surfactant and usually in the range of about 25 to 45 parts non-hydrolyzable silicone-polyether surfactant and 75 to 55 parts of silicone antifoam surfactant per 100 parts by weight of total surfactant.

Additives which may be incorporated into the products of the invention include fillers such as carbon, silica, silicaalumina, zinc oxide, clays, talc, etc.; extending agents such as low molecular weight polymeric materials; plasticizers such as adipate or phthalate esters or esters of trimethylol propane, glycerine, etc.; antioxidants; coloring agents; etc. These materials may be incorporated into the compositions of the invention by addition to the reaction formulation.

In accordance with one method for manufacturing the product of the invention the reaction is carried out in a "one shot" operation in a mold for the finished product by combining the hydroxyl-containing liquid diene polymer, the polyisocyanate, water, the catalysts, the surfactants and other desired additives such as additional polyols and/or polyamines, etc. If desired, the mold may be heated either before or after the reaction mixture is introduced. The reaction is generally maintained in the mold with or without the application of pressure until the desired result is obtained. Upon completion of the reaction the product is removed from the mold.

In a modification of the above procedure a quasi prepolymer is prepared by reacting the liquid hydroxyl-containing copolymer with a sufficient amount of polyisocyanate to produce a mixture of a prepolymer which is largely isocyanate-terminated and free polyisocyanate. The quasi prepolymer is then combined with water and, optionally, additional reactive hydrogen-containing material. The product is then cured as described above in a mold for the finished product.

In a typical formulation for the preparation of the products of the invention the relative amount of the reactants, per 100 parts by weight of total hydroxyl-containing components are:

| Component | Broad Range | Preferred Range |
| --- | --- | --- |
| water | 1.0–3.0 | 1.3–2.0 |
| tin catalyst | 0.02–0.21 | 0.06–0.15 |
| tertiary amine catalyst | 0.03–0.14 | 0.05–0.09 |
| siloxane-polyether copolymer | 0.10–1.1 | 0.20–0.54 |

| Component | Broad Range | Preferred Range |
|---|---|---|
| silicone antifoam agent | 0.10–1.5 | 0.50–0.91 |

The amount of polyisocyanate employed is sufficient to produce a mixture having a ratio of equivalents of isocyanate to total equivalents of reactive hydrogen-containing components of 1.0 to 1.6 and preferably 1.25 to 1.35.

The invention can be used to produce covered or uncovered game balls such as baseballs, softballs, golfballs, lacrosse balls, field hockey balls, croquet balls, etc. The invention can also be used to produce other sports objects, such hockey pucks. It can be appreciated that the density and rebound characteristics of the product of the invention can be varied according to the requirements of the desired end use.

The following examples will serve to further illustrate the invention. Unless otherwise, stated, parts and percentages are on a weight basis.

EXAMPLE I

A polyurethane foam game ball was prepared by the following procedure. A masterbatch blend was prepared by combining and uniformly blending 100 parts of hydroxyl-containing polybutadiene resin having a molecular weight of about 2800 and a hydroxyl functionality of about 2.5, sold by ARCO Chemical Company, Division of Atlantic Richfield Company under the trademark Poly bd ®R-45 HT; 1.5 parts of water; 0.05 part of 2,2'-oxy-bis(N,N-dimethylethylamine), sold by Union Carbide Company as a 70% concentrate in dipropylene glycol under the trademark NIAX A-1; 0.084 part of dibutyltin dilaurate catalyst; 0.37 part of a non-hydrolyzable silicone-polyether copolymer of polydimethylsiloxane and an allylic polyalkylene glycol sold by Dow Corning Company under the trademark DC-193; and 0.71 part of dialkylpolysiloxane comprised substantially of polydimethylsiloxane, sold by Crucible Chemical Company under the trademark Foamkill 8D.

One hundred parts of the above masterblend and 45.7 parts of polycarbodiimide-modified diphenylmethane diisocyanate sold by the Upjohn Company under the trademark Isonate ®143L were mix-metered into a spherical mold having an internal diameter of about 2.76 inches using a Martin Sweets foam machine. The mixture was cured in the mold at ambient temperature for 5 minutes. The cured sphere was then removed from the mold and post-cured at room temperature. The density of the sphere was about 45.2 pounds per cubic foot.

EXAMPLE II

The sphere manufactured in Example I was tested for rebound properties by dropping the sphere from a height of twenty feet onto a concrete surface and measuring the maximum height of the ball after impact. The sphere had a rebound of 11.9 feet (59.5 percent).

The above example illustrates the superior rebound properties of a game ball prepared from a formulation of the invention.

Although the invention is described with particular reference to specific examples, it is understood that the invention includes obvious variants. For example the hydroxyl-containing diene polymer may be a copolymer of the diene and another ethylenically unsaturated material. The scope of the invention is limited only by the breadth of the appended claims.

What is claimed is:

1. In a game ball comprised of a polyurethane foam sphere, the improvement comprising using as the polyurethane foam sphere a foam manufactured from a formulation comprising a liquid diene polymer having a molecular weight of about 500 to 5000 and 1.8 to 3 hydroxyl groups per molecule; a polyfunctional isocyanate containing 2 to 2.7 isocyanate groups per molecule; water; a first catalyst selected from dialkyl stannic diester, stannous diesters and mixtures of these; a second catalyst selected from tertiary amines; a first surfactant which is a non-hydrolyzable silicone-polyether copolymer and a second surfactant comprising at least one dialkylpolysiloxane.

2. The game ball of claim 1 wherein said hydroxyl-containing diene polymer is a hydroxyl-containing butadiene polymer having an average molecular weight of about 1000 to 3500 and containing an average of about 2.1 to 2.8 hydroxyl groups per molecule.

3. The game ball of claim 2 wherein the formulation contains, per each 100 parts of hydroxyl-containing polybutadiene, 1.0 to 3.0 parts of water, 0.02 to 0.21 part of said first catalyst, 0.03 to 0.14 part of said second catalyst, 0.10 to 1.1 part of said first surfactant and 0.10 to 1.5 part of said second surfactant and said isocyanate is present in an amount sufficient to provide an isocyanate/hydroxyl equivalents ratio of about 1.0 to 1.6.

4. The game ball of claim 3 wherein said first surfactant has an average molecular weight of about 1000 to 5000 and said second surfactant has an average molecular weight of about 250 to 5000 and the relative concentrations of said first and second surfactants are about 10 to 50 parts and 90 to 50 parts, based on the total weight of surfactant.

5. In a game ball comprised of a polyurethane foam sphere, the improvement comprising producing said polyurethane foam sphere from a formulation comprising as the essential components:
 (a) 100 parts of a polyol component at least 50% by weight of which a hydroxyl-containing butadiene polymer having a molecular weight of about 1000 to 5000 and about 2.1 to 2.8 hydroxyl groups per molecule,
 (b) 0.02 to 0.21 part of a tin catalyst effective for initiating urethane reaction,
 (c) 0.03 to 0.14 part of a tertiary amine,
 (d) 0.10 to 1.1 parts of a non-hydrolyzable silicone-polyether copolymer,
 (e) 0.10 to 1.5 part of a dialkylpolysiloxane,
 (f) 1.0 to 3.0 parts of water, and sufficient polyisocyante having a functionality of about 2.0 to 2.7 to provide an isocyanate to total hydroxyl group equivalents ratio of about 1.0 to 1.6.

6. In a method of manufacturing a spherical sports ball comprising injecting a polyurethane forming formulation into a closed mold having the desired configuration and causing the formulation to react and cure to a firm polyurethane foam, the improvement comprising preparing the polyurethane foam from a formulation comprised a liquid diene polymer having a molecular weight of about 500 to 5000 and 1.8 to 3 hydroxyl groups per molecule; a polyfunctional isocyanate containing 2 to 2.7 isocyanate groups per molecule; water; a first catalyst selected from dialkyl stannic diesters, stannous diesters and mixtures of these; a second catalyst selected from tertiary amines; a first surfactant which is a nonhydrolyzable silicone-polyether compolymer and a second surfactant comprising at least one dialkylpolysiloxane.

7. The improved process of claim 6 wherein hydroxyl-containing diene polymer is a hydroxyl-containing butadiene polymer having a molecular weight of about 1000 to 3500 and containing an average of about 2.1 to 2.8 hydroxyl groups per molecule.

8. The improved process of claim 7 wherein the formulation contains, per each 100 parts of hydroxyl-containing polybutadiene, 1.0 to 3.0 parts of water, 0.02 to 0.21 part of said first catalyst, 0.03 to 0.14 part of said second catalyst, 0.10 to 1.1 parts of said first surfactant and 0.10 to 1.5 part of said second surfactant and said isocyanate is present in an amount sufficient to provide an isocyanate/hydroxyl equivalents ratio of about 1.0 to 1.6.

9. The improved process of claim 8 wherein said first surfactant has an average molecular weight of about 1000 to 5000 and said second surfactant has an average molecular weight of about 250 to 5000 and the relative concentrations of said first and second surfactants are about 10 to 50 parts and 90 to 50 parts, based on the total weight of surfactant.

10. In a process for manufacturing a spherical game ball comprising injecting a polyurethane forming formulation into a closed mold having the desired configuration and causing the formulation to react and cure to form the polyurethane foam, the improvement comprising using as the essential components;
   (a) 100 parts of a polyol component at least 50% by weight of which a hydroxyl-containing butadiene polymer having a molecular weight of about 1000 to 5000 and about 2.1 to 2.8 hydroxyl groups per molecular,
   (b) 0.02 to 0.21 part of a tin catalyst effective for initiating urethane reaction,
   (c) 0.03 to 0.14 part of a tertiary amine,
   (d) 0.10 to 1.1 parts of a non-hydrolyzable silicone-polyether copolymer,
   (e) 0.10 to 1.5 parts of a dialkylpolysiloxane,
   (f) 1.0 to 3.0 parts of water, and sufficient polyisocyante having a functionality of about 2.0 to 2.7 to provide an isocyanate to total hydroxyl group equivalents ratio of about 1.0 to 1.6.

* * * * *